(12) United States Patent
Kang et al.

(10) Patent No.: US 9,075,708 B1
(45) Date of Patent: Jul. 7, 2015

(54) SYSTEM AND METHOD FOR IMPROVING DATA INTEGRITY AND POWER-ON PERFORMANCE IN STORAGE DEVICES

(75) Inventors: Ho-Fan Kang, San Diego, CA (US);
Stephen P. Hack, Firestone, CO (US);
Jerry Lo, Hacienda Heights, CA (US);
Frederick H. Adi, Costa Mesa, CA (US); Lan D. Phan, Garden Grove, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1042 days.

(21) Appl. No.: 13/173,431

(22) Filed: Jun. 30, 2011

(51) Int. Cl.
*G06F 12/00* (2006.01)
*G06F 12/02* (2006.01)

(52) U.S. Cl.
CPC .... *G06F 12/0246* (2013.01); *G06F 2212/7209* (2013.01); *G06F 2212/7207* (2013.01); *G06F 2212/7202* (2013.01)

(58) Field of Classification Search
CPC ................ G06F 2212/7209; G06F 2212/7202; G06F 2212/7207; G06F 2212/72

USPC ......................................................... 711/103
See application file for complete search history.

(56) References Cited

U.S. PATENT DOCUMENTS

| 7,389,308 | B2 | 6/2008 | Bailey | |
|---|---|---|---|---|
| 2003/0163663 | A1* | 8/2003 | Aasheim et al. | 711/202 |
| 2004/0015642 | A1* | 1/2004 | Moir et al. | 711/1 |
| 2006/0155931 | A1 | 7/2006 | Birrell et al. | |
| 2008/0098192 | A1* | 4/2008 | Im et al. | 711/170 |

* cited by examiner

*Primary Examiner* — Larry Mackall

(57) ABSTRACT

The present disclosure is directed to managing write commands for a storage system implementing address indirection. In some storage systems, a mapping table that provides logical-to-physical mapping may have individual entries that each references a logical address size that exceeds the size of an atomic write to the storage media. In such systems, a write to a logical address is not atomic as it may require several discrete physical writes that may individually fail. The techniques presented employ several pre-commit and post-commit actions to save data that enables the storage system to make writes to these logical addresses atomic and prevent undue delay on powerup.

12 Claims, 7 Drawing Sheets

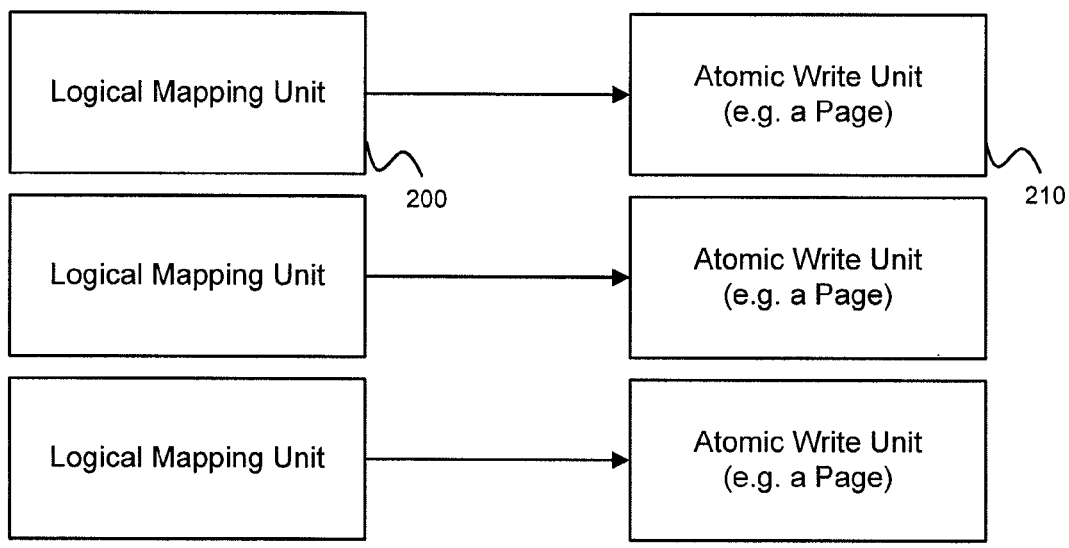
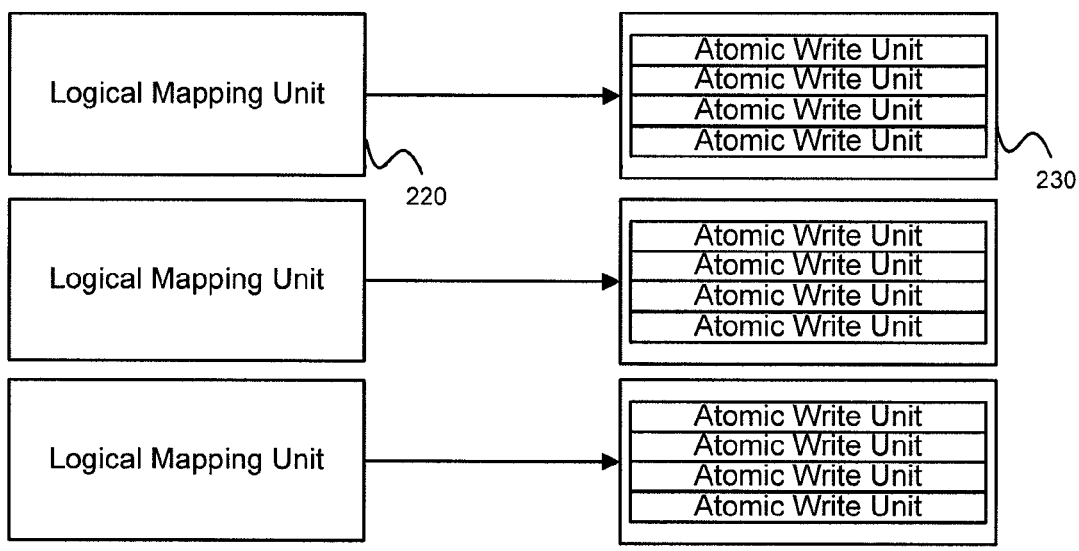

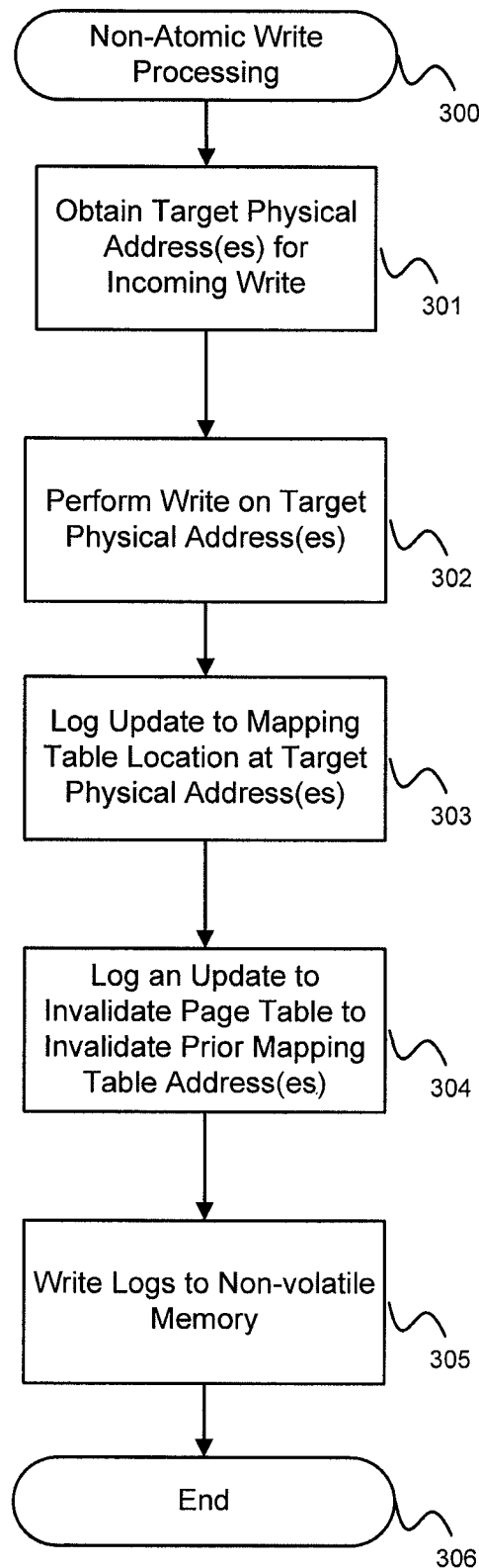

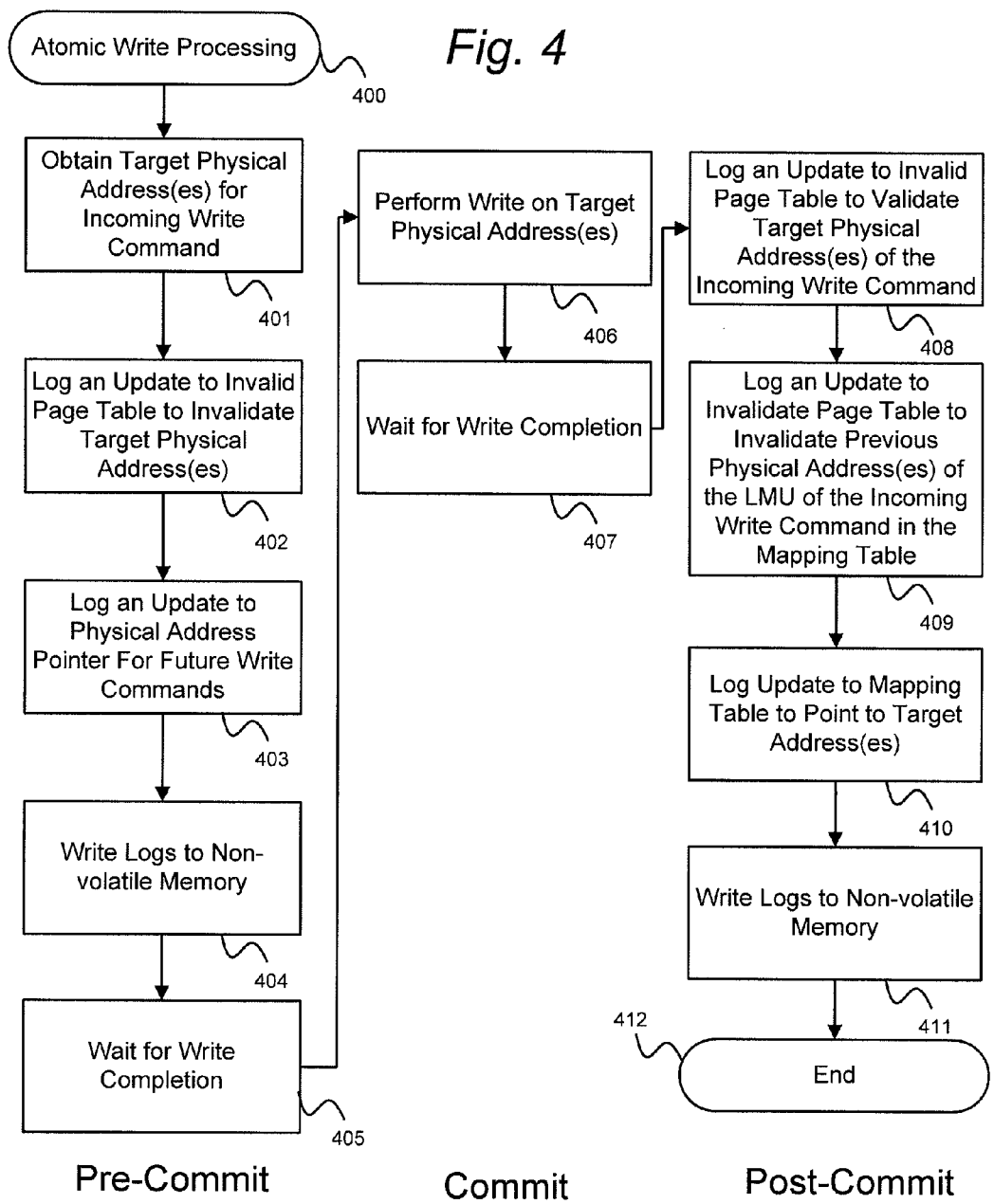

SYSTEM AND METHOD FOR IMPROVING DATA INTEGRITY AND POWER-ON PERFORMANCE IN STORAGE DEVICES

BACKGROUND

1. Technical Field

This disclosure relates to non-volatile storage devices. Specifically, this disclosure relates to improving data consistency/integrity in non-volatile storage devices.

2. Description of Related Art

Prior implementations of logical-to-physical mapping in non-volatile storage devices typically sized a logical mapping unit (LMU) to the size of an atomic write. That is, a write to an LMU (e.g., a logical address in a mapping table entry) corresponded to an atomic physical write/program operation on the storage media (e.g., programming a page). Therefore, a write to a logical address was either completed or not completed if power was lost at any point in time. Where the size of a logical mapping unit exceeds the size of an atomic physical write, it is possible for portions of the logical mapping unit to not be written before power is lost. As a result, when the storage system is powered on after a power loss, the system must determine which logical mapping units were partially written and revert to a prior version of the partially written logical mapping unit(s). The determination of partially-valid logical mapping units can result in significant delays while powering on the system; thus significantly impacting initial host responsiveness.

BRIEF DESCRIPTION OF THE DRAWINGS

Systems and methods which embody the various features of the invention will now be described with reference to the following drawings, in which:

FIGS. 2A and 2B illustrate a logical mapping unit which corresponds to an atomic write unit and a logical mapping unit which corresponds to a plurality of atomic write units.

FIG. 3 illustrates an example process that does not make write commands to LMUs atomic.

FIG. 4 illustrates a process that makes write commands to LMUs atomic according to an embodiment.

DETAILED DESCRIPTION

Figure 1:
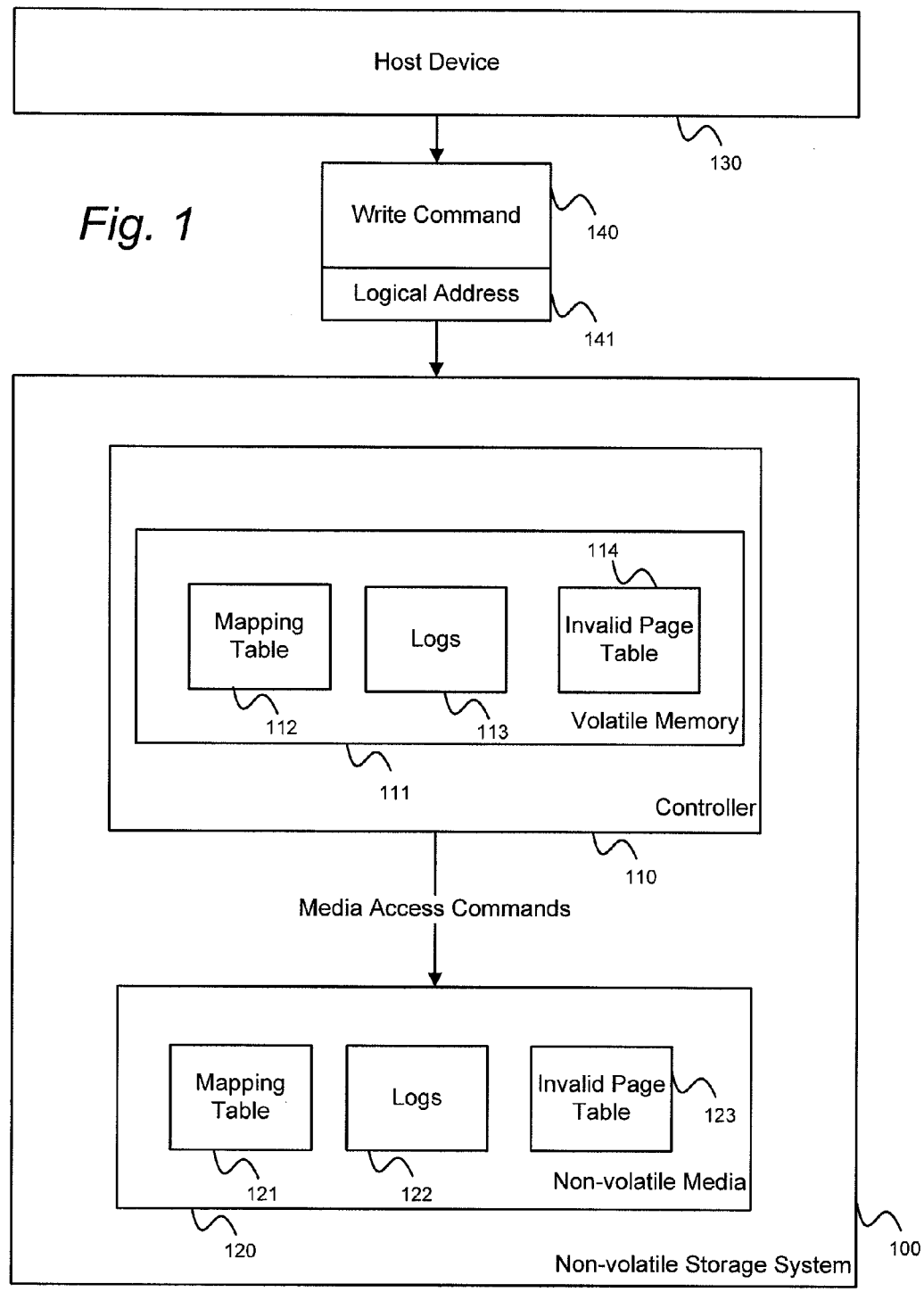
FIG. 1 illustrates a system overview of a non-volatile storage system according to an embodiment.

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

System Overview

Embodiments of the invention are directed to systems and methods for ensuring that a write to a logical mapping unit (LMU), which may include several discrete atomic writes to physical addresses, is atomic. A mapping table is frequently used in a non-volatile storage system to provide logical-to-physical mapping from a host's logical address to the physical storage address. As capacity for storage systems increases, the amount of data stored in a mapping table also linearly increases in size. In order to reduce the amount of data stored in a mapping table and realize costs saving from the resulting reduced memory needs, each mapping table entry can reference an increased amount of physical address space. For example, rather than referring to a single atomic write size (typically a physical page, usually 8 k of storage), each mapping table entry ("logical mapping unit" or "LMU") can refer to 64 or 128 physical pages and thereby reduce the size of a mapping table. However, a write to a single LMU in such a system is no longer atomic since power can be lost while the pages assigned to the LMU are being written. This disclosure provides several embodiments that ensure writes to LMUs are atomic by making pre-commit and post-commit records of the writes. In an embodiment, the pre-commit and post-commit records are stored to one or more logs or other journal of drive activity saved to non-volatile storage and such logs and/or journal can be referenced on startup to quickly determine whether writes to certain LMUs were successfully executed.

As used in this application, "non-volatile memory" can refer to any non-volatile memory implementing address indirection. The address indirection is typically implemented with a logical-to-physical mapping which decouples the host's logical addresses from the physical storage location in a storage media. As a result, this disclosure may be applicable to solid-state memory such as NAND flash. The systems and methods of this disclosure may also be useful in more conventional hard drives and hybrid drives including both solid-state and hard drive components. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Referring to FIG. 1, a non-volatile storage device 100 according to one embodiment is shown. The non-volatile storage device 100 includes a controller 110 and a non-volatile storage media 120. The controller 110 typically includes a volatile memory 111 that in one embodiment includes data relating to a mapping table 112, a log of changes 113 and an invalid page table 114. The controller may be a processor or a plurality of processors, or may be implemented in hardware in whole or in part. The volatile memory 111 in one embodiment includes data used in the operation of the controller 110. Although depicted to be a part of the controller in FIG. 1 the volatile memory 111 may be outside of the controller. The mapping table 112 in one embodiment provides a logical-to-physical mapping for the logical addresses used by a host device 130 to be translated to physical addresses for accessing the non-volatile storage media 120. The invalid page table 114 can indicate physical addresses that do not contain valid data and may be treated as eligible for garbage collection operations. As changes are made to the mapping table and invalid page table, these changes may be recorded in the logs 113 for saving in the non-volatile storage media.

In one embodiment, the non-volatile storage media 120, in addition to storing user data, stores non-volatile versions of the data in the volatile memory 111. For example, the mapping table 121, logs 122, and invalid page table 123 may store persistent copies of data resident on the volatile memory 111. These non-volatile versions on the storage array allow the system to maintain coherency and storage organization through a power off-on cycle. On powerup, the controller 110 may load the mapping table 121 and invalid page table 123 to the volatile memory as the mapping table 112 and invalid page table 114. Because the invalid page table 114 and mapping table 112 are relatively large, updated versions of such tables are infrequently copied as a whole to the non-volatile storage media 120. Updated versions of the logs 113 are stored relatively frequently to the non-volatile storage media and can therefore serve to provide finer-grained updates to the persistent copies of mapping table and invalid page table.

The non-volatile storage system 100 may be connected to a host device 130. The host command can issue a write command 140 with an associated logical address 141. The controller 110 typically receives the write command 140 and converts the logical address 141 to a physical address. The address conversion may include updating the designated physical address for the logical address in the mapping table 112 and adding a corresponding entry in the logs 113. If the logical address was previously associated with a physical address in the non-volatile storage media 120, that physical address will be invalidated in the invalid page table 114 and an update to the invalid page table can be saved to the logs 113. The logs 113 can then be stored to the non-volatile storage media as logs 122.

Logical Mapping Units

Referring to FIGS. 2A and 2B, two embodiments of a mapping table are shown. In the embodiment shown in FIG. 2A, a logical mapping unit (LMU) 200 refers to a single atomic write unit 210 (e.g., a physical page). That is, each entry in the mapping table designates a single atomic write transaction, such as the programming of a page. An advantage of this approach is that when the controller executes a write command at a LMU, the entire LMU is either written or not written atomically (since the single physical page write either succeeds or fails). In the embodiment in FIG. 2B, each LMU now comprises a plurality of atomic write units 230 (e.g., multiple physical pages). As such, it is possible for each atomic write to independently succeed or fail. Though an LMU is shown in this embodiment as including four atomic write units, any number of write units per LMU is contemplated by this disclosure, such as 32, 64, 128 or more atomic write units to an LMU. Because portions of a write to the LMU can fail, the entire block of atomic write units may need to be re-written to another physical address section so that the LMU can designate consecutive physical addresses. Due to this possibility, it is advantageous for a write to an LMU encompassing a plurality of atomic write units to be conducted atomically.

Non-Atomic Write Processing

FIG. 3 illustrates an example process that does not make write commands to LMUs atomic. At block 300, the non-atomic write processing begins when a new write command is received. At block 301, the target physical address(es) are obtained for the write command. At block 302, the write is performed on the target physical address(es). At block 303, the mapping table is updated to reflect the new physical address(es) and a log of the change is made. At block 304, the invalid page table is updated and a log of the changes made to the invalid page table is also created. At block 305, the logs are written to non-volatile memory and the process ends at block 306. If the system loses power or shuts down during the write executions at block 302, the system has not recorded the necessary data to reflect the partially completed writes (i.e., changes to the invalid page table and mapping table). As such, data integrity is likely impacted by the presence of these partial writes. Some fallback mechanisms may be used to address at least part of the problem, though they may come with certain drawbacks. For example, on power-up, the system may scan the physical locations corresponding to a list of upcoming write locations to determine if a write actually occurred that was never recorded. By performing the scan, the system can then determine whether to maintain the partial write or revert to the old data. This scan for partially written data operates as a protective fallback, but can take significant processing time and delay readiness of the system on powerup. However, this scanning alone is likely insufficient to provide for data recovery as additional (and potentially complex) logging mechanisms may be needed to revert to old data and fully reconstruct the lost data.

"Atomic" Write Processing

Referring now to FIG. 4, a process is shown according to an embodiment for ensuring writes to individual LMUs that span multiple atomic write units become atomic processes. While the writes to LMUs are not actually atomic writes as discussed above, this process saves reference data before and after the physical atomic writes as to convert individual writes to LMUs into atomic transactions. As a result, the system can ensure data integrity by providing for a mechanism to account for and recover from partially-written LMUs. The system can also avoid needing to scan physical addresses on power-up to detect partially-written LMUs. This process can be performed by, for example, the controller in FIG. 1. As a brief overview, the process depicted in FIG. 4 is comprised of a pre-commit, commit, and post-commit phase. The pre-commit phase includes actions taken prior to programming the storage array with the actual data, the commit phase includes actions taken to program the storage array, and the post-commit phase includes actions taken after the programming to update the system after the write has completed.

In one embodiment, the pre-commit and commit phases are executed as follows. At block 400, a write command is received and the atomic write processing for an LMU is initiated. As before, at block 401, target physical addresses are designated for the write command. At block 402, the designated physical addresses are invalidated in the invalid page table, and a log of the invalidation is created. At block 403, the pointer designating physical address locations for future write commands is moved to indicate that the physical addresses are no longer available and a log is created to reflect this change. At block 404, each of the logs created at blocks 402-403 are stored to non-volatile memory. In other embodiments, one log may be used in place of the multiple logs. At block 405, the process waits for the logs to be committed (i.e., saved) to non-volatile memory before proceeding to the commit phase at block 406. At block 406, the write is performed on the target physical addresses, and at block 407, the process waits for the writes to the physical addresses to complete before moving to the post-commit phase.

By recording the logs mentioned in blocks 402-403 and ensuring these logs are committed to non-volatile memory prior to writing the data for the LMU, the system can recover on powerup without scanning the physical addresses. As an example, suppose power is lost during block 406 in a write to physical addresses 4-7, and as a result, some portion of the writes to physical addresses 4-7 failed to complete. Because the logs include an indication that reflects that addresses 4-7 are invalid and an indication that the next physical write location pointer has been moved from addresses 4-7, on system start-up, the partially-written physical addresses 4-7 will be treated as invalid by the controller based on the indications in the logs, and will become eligible for garbage collection or reuse. Additionally, the next physical write location pointer will have been moved and the system will not attempt to write to addresses 4-7.

On completion of the writes at block 407, the post-commit phase can begin at block 408. At block 408, the target physical addresses (the addresses which were just written at block 406) are validated in the invalid page table and a log is created of the validation. At block 409, the physical addresses previously associated with the logical address are invalidated in the invalid page table and a log is created of the invalidation. At block 410, the mapping table is updated to reference the newly-written physical addresses. At block 411, the logs of the changes made at blocks 408-410 are written to non-volatile memory and the process ends at block 412. Prior to initiating the process again for the next write command(s) at block 400, the system may also need to wait for the logs to complete writing at block 411. In other embodiments, one log may be used in place of the multiple logs. The re-validation of the target addresses and the mapping table update enable the newly-written data to be used.

An example process has been shown here in FIG. 4. Several alterations are possible and within the scope of the various embodiments of invention. For example, blocks 402 and 403 can be performed in either order as long as they are stored prior to the writes at block 406. Similarly, the post-commit steps in blocks 408, 409, and 410 could be performed in other orders. In addition, the example shown in FIG. 4 illustrates a single command in isolation. In some embodiments, several LMU writes are bundled together into groups of writes which undergo the pre-commit, commit, and post-commit phases together. For example, a batch of 32 write commands may arrive from the host system and the logs reflecting changes to the invalid page table and mapping table for the 32 write commands may be saved together. In an embodiment, this batching is performed by inserting a loop for each phase. For example, a loop can be inserted from block 403 to block 401 to generate a series of logging entries for the batch of commands before committing these logs at block 404. The process may also loop through the physical writes for the commands in block 406 and proceed beyond block 407 only when the commands have been physically written. Another loop may be inserted from block 410 to block 408 to process the post-commit operations for the commands before the logs are saved at block 411. In addition, while designated a "log" in this application, any method or technique for providing a record for use by the system after power loss may be useful in fulfilling the objectives of the "log." For example, the "log" may take the form of a journal or a special portion of memory which automatically records any changes to the mapping table and invalid page table. While not described in detail in this disclosure, a separate process may ensure the writing of the logs to the non-volatile memory is atomic. That is, the writes at blocks 404 and 411 may be atomic transactions themselves.

Storage Component Contents

Figure 5A:
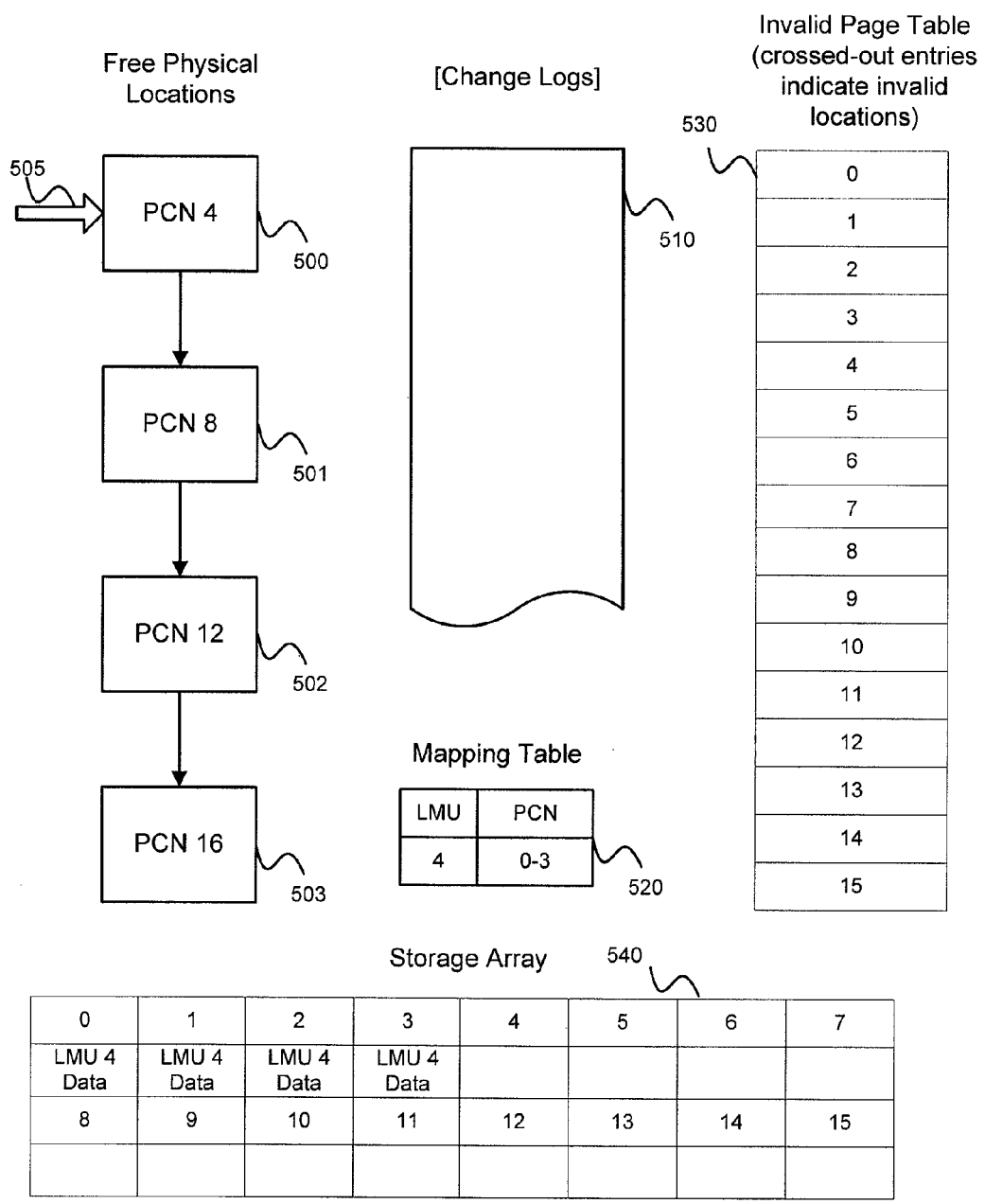
FIGS. 5A-5C illustrate an embodiment for making write commands to LMUs atomic.
Figure 5B:
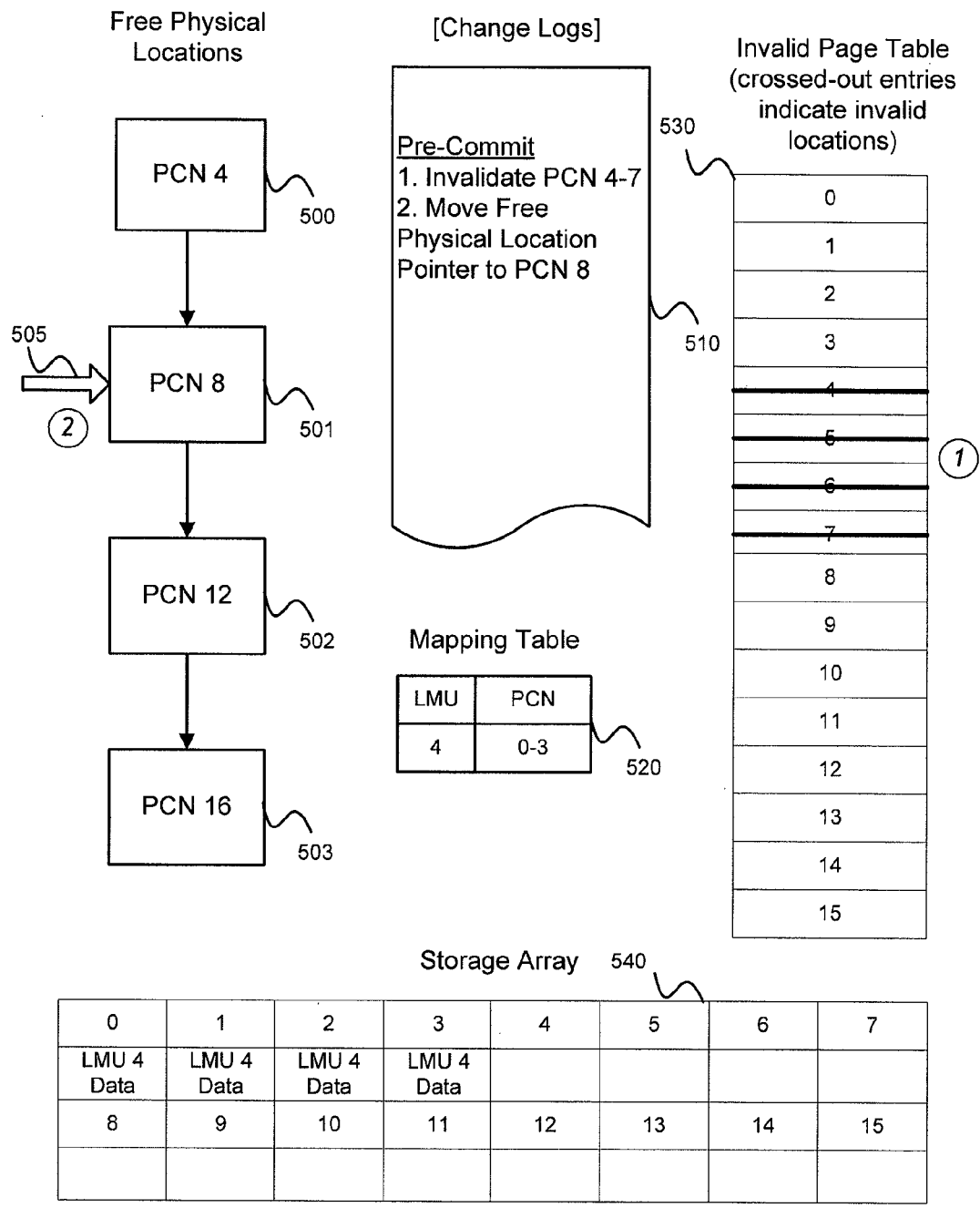
Figure 5C:
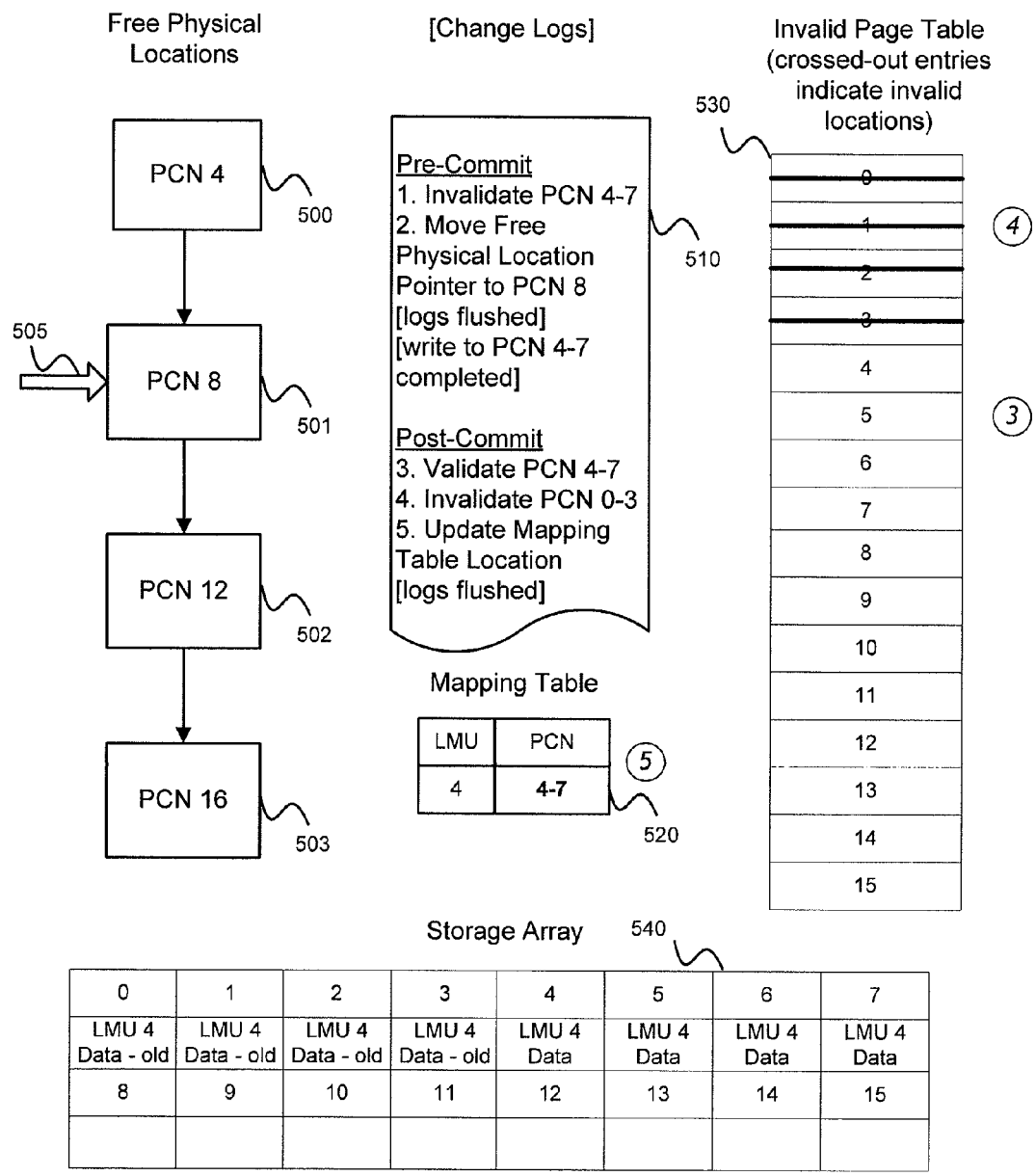

FIGS. 5A through 5C illustrate the effects of the process described in FIG. 4 on the various data components according to an embodiment. FIG. 5A shows the components prior to receipt and execution of the write command. FIG. 5B shows the components after completion of the pre-commit steps. Starting with FIG. 5A, FIG. 5A shows a list of free physical locations 500, 501, 502, and 503. FIG. 5A also shows change logs 510, a mapping table 520, an invalid page table 530, and a physical storage array 540. In this example, the LMU in question (LMU 4 or Logical Chuck Number (LCN) 4) currently references Physical Chunk Numbers (PCN) 0-3, as indicated in the mapping table 520 and as shown in the storage array 540. The free physical locations pointer 505 currently indicates that free physical location 500 designating PCN 4 is the next physical location available for writing. The invalid page table 530 indicates that all physical locations are valid/uninitialized. In an embodiment, the absence of an invalid indication means that the physical location is either valid or uninitialized and valid locations are distinguished by being referred to in the mapping table. In another embodiment, an additional designation is used in a table to distinguish physical locations that are valid from those that are uninitialized.

FIG. 5B shows the example system after the execution of the pre-commit steps. In this example system, the incoming write command indicates a write to LMU 4. The change logs indicate the pre-commit steps that were taken. First, the log records that the target PCNs 4-7 have been invalidated. As shown in the invalid page table and the circle designating a "1," the crossed out PCNs show that PCNs 4-7 have been invalidated (the number in the circle corresponds to the item number in the change logs). Next, the free physical location pointer is moved from free physical location 501 (PCN 4) to free physical location 502 (PCN 8) as indicated by the circle designating a "2." The log indicating these changes is now saved ("flushed") to the non-volatile storage prior to executing any writes to the physical storage. Accordingly, if power is lost while executing the writes to PCNs 4-7, the system can detect the failure of the write to LMU 4 upon start-up based on indications in the saved logs reflecting the invalidation and free physical location pointer movement.

FIG. 5C shows the example system after the execution of the commit and post-commit steps. As shown in the storage array 540, the write command data directed to LMU 4 has now been written to PCNs 4-7, and PCNs 0-3 now contain the old data referenced by LMU 4. This is the commit step. In the post-commit steps, the target PCNs which now contain the newly written data are marked valid in the invalid page table, as indicated by the circle designating a "3." Next, the PCNs containing the old data for LMU 4 are invalidated, as indicated by the circle designating a "4." Last, the mapping table is updated to indicate LMU 4 now references PCNs 4-7, as indicated by the circle designating a "5." Each of the actions "3," "4," and "5" is recorded in the change logs 510 as shown and the logs can now be saved to the non-volatile memory to record the post-commit activity to enable use of the newly written data.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIGS. 3, 4, and 5A-5C may differ from those shown in the figures. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A non-volatile storage system, comprising:
a non-volatile storage array; and
a controller comprising a volatile memory, the controller configured to:
maintain a mapping table and a record of invalid physical addresses in the volatile memory, wherein a data size of a logical address referenced by an entry of the mapping table is larger than a data size of an atomic program command that can be executed on the non-volatile storage array;
receive a write command from a host system directed to a logical address referenced by an entry in the mapping table;
identify a plurality of physical addresses to be used for the write command, wherein performing the write command comprises executing a plurality of program commands, and wherein each of the program commands corresponds to a different physical address from the plurality of physical addresses;
mark each physical address of the plurality of physical addresses as invalid in the record of invalid physical addresses;
save a copy of the record of invalid physical addresses to the non-volatile storage array;
after saving the copy of the record, execute the plurality of program commands on the non-volatile storage array at the plurality of physical addresses; and
when the execution of the plurality of program commands is complete, mark each physical address of the plurality of physical addresses as valid in the record of invalid physical addresses to obtain an updated record of invalid physical addresses that reflects changes made by the execution of the program commands and replace the coy of the record with a copy of the updated record at the non-volatile storage array,
whereby saving the copy of the record of invalid physical addresses before executing the plurality of program commands and replacing the copy with the updated record of invalid physical addresses after execution of the plurality of program commands is complete transforms the plurality of program commands into an atomic transaction.

2. The non-volatile storage system of claim 1, wherein in case at least one of the program commands fails to complete, the saving of the first change to the record of invalid physical addresses to the non-volatile storage array provides a persistent record that enables the controller to determine that at least one of the program commands has failed.

3. The non-volatile storage system of claim 1, wherein the copy of the record of invalid physical addresses is saved to the non-volatile storage array in the form of a log.

4. The non-volatile storage system of claim 1, wherein the controller is further configured to:
invalidate, in the record of invalid physical addresses, physical addresses indicated by the mapping table as being associated with the logical address; and
update the mapping table to associate the logical address to the physical addresses.

5. The non-volatile storage system of claim 1, wherein the copy of the updated record is saved to the non-volatile storage array in the form of a log.

6. The non-volatile storage system of claim 1, wherein the non-volatile storage array comprises a shingled hard disk or a solid-state storage array.

7. The non-volatile storage system of claim 1, wherein the data size of a logical address referenced by an entry of the mapping table is an integer multiple of the data size of an atomic program command that can be executed on the non-volatile storage array.

8. The non-volatile storage system of claim 7, wherein the data size of an atomic program command matches a data size of a page in the non-volatile storage array.

9. A method of executing a write command by a controller in a non-volatile storage system, comprising:
maintaining a mapping table and a record of invalid physical addresses, wherein the data size of a logical address referenced by an entry of the mapping table is larger than a data size of an atomic program command that can be executed on a non-volatile storage array;
receiving, from a host system, a write command directed to a logical address referenced by an entry in the mapping table;
obtaining a plurality of physical addresses to be used for the write command, wherein performing the write command comprises executing a plurality of program commands, and wherein each of the program commands corresponds to a different physical address from the plurality of physical addresses;
identifying each physical address of the plurality of physical addresses as invalid in the record of invalid physical addresses;
saving a copy of the record of invalid physical addresses to the non-volatile storage array;
when the saving of the copy of the record of invalid physical addresses is complete, executing the plurality of program commands on the non-volatile storage array at the plurality of physical addresses; and
when the execution of the plurality of program commands is complete, identifying each physical address of the plurality of physical addresses as valid in the record of invalid physical addresses to obtain an updated record of invalid physical addresses that reflects changes made by the execution of the program commands and replace the copy of the record with a copy of the updated record at the non-volatile storage array;
whereby saving the copy of the record of invalid physical addresses before executing the plurality of program commands prevents use of data from partially-executed write commands.

10. The method of claim 9, further comprising the step of loading the mapping table, wherein the loading uses the plurality of physical addresses only if the replacing of the copy of the record with the copy of the updated record has completed.

11. The method of claim 9, wherein the copy of the record of invalid physical addresses is saved to the non-volatile storage array in the form of a log.

12. The method of claim 9, wherein the copy of the updated record is saved to the non-volatile storage array in the form of a log.

* * * * *